United States Patent
Meurer

(10) Patent No.: US 7,940,671 B2
(45) Date of Patent: May 10, 2011

(54) SYSTEMS AND METHODS FOR MULTIPLEXING NETWORK ALARM SIGNALS

(75) Inventor: Vance Lee Meurer, Palmer, TX (US)

(73) Assignee: Qwest Communications International, Inc., Denver, CO (US)

( * ) Notice: Subject to any disclaimer, the term of this patent is extended or adjusted under 35 U.S.C. 154(b) by 1740 days.

(21) Appl. No.: 10/323,246

(22) Filed: Dec. 18, 2002

(65) Prior Publication Data

US 2004/0123189 A1    Jun. 24, 2004

(51) Int. Cl.
*H04L 1/00* (2006.01)

(52) U.S. Cl. .................................................. 370/241

(58) Field of Classification Search .......... 370/241–247, 370/250, 498, 532, 537, 538, 907; 702/57–59, 702/188
See application file for complete search history.

(56) References Cited

U.S. PATENT DOCUMENTS

| | | | | |
|---|---|---|---|---|
| 3,922,493 A * | 11/1975 | Brenig et al. | ................. | 370/477 |
| 4,400,694 A * | 8/1983 | Wong et al. | .................... | 340/505 |
| 5,058,104 A * | 10/1991 | Yonehara et al. | ............. | 370/242 |
| 5,936,942 A * | 8/1999 | McNeley et al. | ............. | 370/244 |
| 7,085,237 B1 * | 8/2006 | Teodorescu | ................... | 370/242 |
| 2002/0095269 A1 * | 7/2002 | Natalini et al. | ............... | 702/188 |
| 2002/0191648 A1 * | 12/2002 | Yehuda et al. | ................ | 370/539 |
| 2003/0031212 A1 * | 2/2003 | Becker et al. | ................. | 370/537 |

OTHER PUBLICATIONS

Black. Sonet and T1, Prentice Hall, 1997, pp. 118-121.*
Web page: Nortel Networks: Products, Services & Solutions, at: URL=http://www.nortelnetworks.com/products/01/sonnet/oc48lite/features.html. Printed Mar. 12, 2003. pp. 1-2.
Web page: Dantel: "Telecommunications, Alarm Networks, Performance Management," at: URL=http://www.dantel.com/productlist.asp?CategoryID=13&topcat=ESP_Systems_(tm)_Printed Mar. 12, 2003. pp. 1-2.
Web page: Dantel: "Telecommunications, Alarm Networks, Performance Management," at: URL=http://www.dantel.com/productdetail.asp?ParentCategoryID=13&CategoryID=11 Printed Mar. 12, 2003. pp. 1-2.
PointMaster® Eagle, "Leader in Alarm Network Monitoring." 2002 by Dantel, Inc. Feb. 14, 2002. pp. 1-4.

* cited by examiner

*Primary Examiner* — Dmitry H Levitan

(57) ABSTRACT

A method of monitoring a plurality of network elements relating to a network includes receiving a X bit signal indicative of an alarm condition relating to one of the plurality of network elements and generating a Y bit signal representative of the alarm condition relating to the one of the plurality of network elements. The method further includes transmitting the Y bit signal over the network to a network monitoring location in an overhead portion of a data frame. According to the method, Y is greater than X.

16 Claims, 3 Drawing Sheets

SYSTEMS AND METHODS FOR MULTIPLEXING NETWORK ALARM SIGNALS

BACKGROUND OF THE INVENTION

This invention generally relates to communications networks. More specifically, this invention relates to processing signals representative of the condition of network elements and/or support infrastructure.

Modern communication is essentially dependent on communications networks. Nearly every type of electronic communication passes through one or more networks, such as Wide Area Networks, Local Area Networks, intranets, the Internet, and the like. Such networks may comprise optical, electrical, and/or wireless links. In all cases, however, the reliability of the network depends on the proper function of the components (i.e., network elements) comprising or supporting the network.

Network monitoring systems monitor network elements and infrastructure. With continued increases in the pervasiveness of networks, however, network monitoring systems often must monitor greater numbers of elements in more diverse situations. Therefore, improved methods and systems are needed for monitoring network elements.

BRIEF SUMMARY OF THE INVENTION

A method of monitoring a plurality of network elements relating to a network includes receiving a X bit signal indicative of an alarm condition relating to one of the plurality of network elements and generating a first Y bit signal representative of the alarm condition relating to the one of the plurality of network elements. In this embodiment, Y is greater than X. The method also includes transmitting the Y bit signal over the network to a network monitoring location in an overhead portion of a data frame. In some embodiments, the X bit signal comprises a single bit binary signal. The Y bit signal may comprise an eight bit binary signal. In other embodiments, the Y bit signal may comprise a sixteen bit binary signal. The method also may included receiving the Y bit signal at the network monitoring location and converting the Y bit signal into a visual representation of an alarm condition relating to the one of the plurality of network elements. In yet other embodiments, the method may include receiving an indication of an absence of an alarm condition relating to the one of the plurality of network elements and generating a second Y bit signal representative of the absence of an alarm condition relating to the one of the plurality of network monitoring elements. The second Y bit signal then may be transmitted over the network to the network monitoring location. The method also may include receiving the second Y bit signal at the network monitoring location and converting the second Y bit signal into a visual representation of an absence of an alarm condition relating to the one of the plurality of network elements. Transmitting the second Y bit signal may include transmitting the second Y bit signal in an overhead portion of a data frame.

In other embodiments of the present invention, a network alarm multiplexer includes a plurality of inputs that are each configured to receive an alarm signal from one of a plurality of alarmed items. The multiplexer also includes a multiplexing circuit that, upon the receipt of a network alarm signal on one of the plurality of inputs, produces a multi-bit, binary coded decimal representation of the one of the plurality of inputs to which the network alarm signal is received. The multiplexer also includes a plurality of output channels that receive the multi-bit binary coded decimal representation and place the multi-bit binary coded decimal representation onto an optical portion of a network. The multiplexing circuit may be configured to produce a multi-bit, binary coded decimal signal representative of an alarm clear signal received at one of the plurality of inputs.

In still other embodiments of the present invention, a network monitoring system for monitoring a plurality of network elements relating to a network includes means for receiving an indication of an alarm condition relating to one of the plurality of network elements and means for generating a first binary coded signal representative of the alarm condition relating to the one of the plurality of network elements. The system also includes means for transmitting the first binary coded signal over the network in an overhead portion of a data frame to a network monitoring location. The network monitoring system also may include means for generating a second binary coded decimal signal representative of an alarm clear condition relating to one of the plurality of network elements.

In still further embodiments of the present invention, a system for monitoring a plurality of network elements relating to a network includes a first receiving arrangement that receives a X bit signal indicative of an alarm condition relating to one of the plurality of network elements and a generating arrangement that generates a first Y bit signal representative of the alarm condition relating to the one of the plurality of network elements. In some of the embodiments, Y may be greater than X. The system also includes a transmitting arrangement that transmits the Y bit signal over the network to a network monitoring location in an overhead portion of a data frame. The X bit signal may be a single bit binary signal. In some embodiments, the Y bit signal may be an eight bit binary signal; in others, the Y bit signal may be a sixteen bit binary signal. The system also may include a second receiving arrangement that receives the Y bit signal at the network monitoring location and a converting arrangement that converts the Y bit signal into a visual representation of an alarm condition relating to the one of the plurality of network elements. The first receiving arrangement may be configured to receive an indication of an absence of an alarm condition relating to the one of the plurality of network elements. The generating arrangement may be configured to generate a second Y bit signal representative of the absence of an alarm condition relating to the one of the plurality of network monitoring elements, and the transmitting arrangement may be configured to transmit the second Y bit signal over the network to the network monitoring location. The second receiving arrangement may be configured to receive the second Y bit signal at the network monitoring location. The converting arrangement may be configured to convert the second Y bit signal into a visual representation of an absence of an alarm condition relating to the one of the plurality of network elements. The transmitting arrangement may be further configured to transmit the second Y bit signal in an overhead-portion of a data frame.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Figure 1:
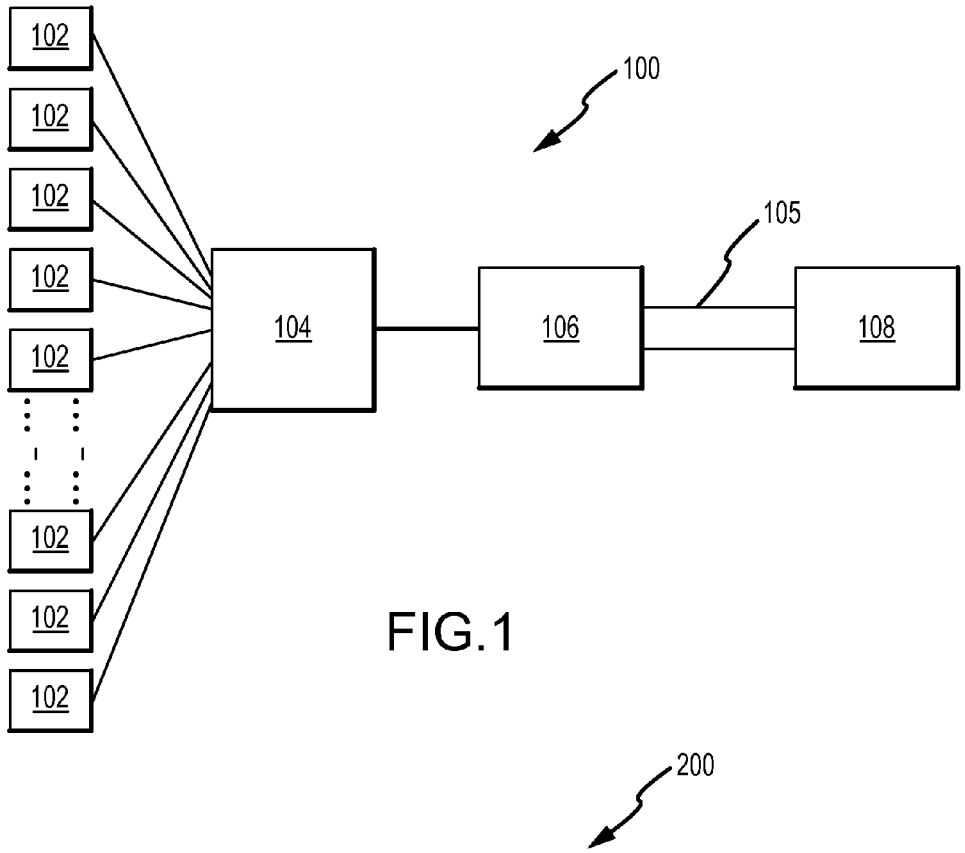
FIG. 1 is a schematic block diagram illustrating a network monitoring system according to embodiments of the present invention.

Network monitoring systems are configured to receive alarm signals from network elements, route the signals to a network monitoring location, and convert the signals into usable information. In response, decisions may be made or actions taken to resolve actual or potential network problems.

In light of the complexity of modern networks, many items potentially may affect network performance. For example, the failure of a generator, the opening or closing of a door, the failure of a power supply, and the like, all may contribute to network degradation. Thus, the need for monitoring numerous network elements exists.

Network monitoring typically involves hardwiring a connection between a terminal associated with a network element and a network telemetry card. The terminal generally comprises a device that generates a binary signal when the alarmed condition of the item being monitored changes. Terminals may be either normally open or normally closed. Thus, either the presence or absence of a closed circuit may indicate an alarm condition for the network element.

A network telemetry card may monitor multiple network elements simultaneously. When it senses an alarm condition on one of its monitored items, the network telemetry card places on the network a signal that represents the network element. The signal is sent to a network monitoring location.

Presently available network monitoring systems are of two general types. The first type of network monitoring system receives alarm signals from a multitude of network elements, and converts alarm signals into a data stream, such as a TCP/IP data stream. The data stream is then sent over an electronic (as opposed to an optical) portion of the network (e.g., an Ethernet). Ultimately, the signal arrives at a network monitoring location where the data is converted into useful information. One example of this type of network telemetry card is the PointMaster® Eagle by Dantel.

Network monitoring systems of this type have a number of limitation. First, such systems are useful only in locations capable of receiving electronic signals. That is, the monitored location must have an electronic network such as an Ethernet present to receive the signal since such systems are not configured to place signals on an optical network. Second, such systems eventually route the alarm information to a "payload" portion of a network data frame, as opposed to an "overhead" portion. This is particularly significant to network providers because it has the effect of reducing the revenue-generating capacity of the network. Thus, improved solutions are needed.

A second type of monitoring system receives alarm signals from a limited number of network items. A parallel telemetry card receives signals from the network elements and converts the alarms to an optical signal. This optical signal is then added to an optical portion of the network for further routing to a network monitoring location. Network monitoring systems of this type transmit signals in the overhead potion of the optical network, thus preserving the payload portion for revenue generation. Conversely, however, network monitoring systems of this type are limited to a small number of inputs or alarmed items. Parallel telemetry cards send separate signals along the network for each input the card receives. Thus, a large number of inputs becomes unmanageable.

According to the present invention, a network telemetry card, such as a parallel telemetry card, may be used to transmit binary coded signals representing alarm conditions at network elements. The number of network elements serviced by a single telemetry card may be greater than the telemetry card's number of inputs. This is possible through multiplexing of alarm signals. An alarm signal multiplexer receives alarm signals from a number ($2^n$) of network elements. In a specific embodiment, each signal comprises a single digit binary signal. The signal multiplexer then generates a multi-digit binary coded signal, having at least n digits, representative of the alarmed element, typically based on the input to which the element is connected. The binary coded signal is then routed to the telemetry card, which places the signal on the network in an overhead portion of a data frame for transportation to a network monitoring location. At the network monitoring location, the signal is converted into a visual representation that an alarm condition exists at the alarmed element. Thereafter, the alarm condition may be cleared also by sending a binary coded signal in the network overhead.

The present invention is described in more detail with respect to FIG. 1. FIG. 1 illustrates a network monitoring system 100 according to embodiments of the present invention. The system 100 includes a plurality of monitored network elements or network infrastructure elements 102 (hereinafter collectively "network elements"). Network elements 102 may be any item that may affect network performance. For example, network elements 102 may be power supplies, routers, switches, and the like. Network elements also may include doors, generators, and the like. Many other examples are possible.

Network elements 102 typically have terminals (not shown) to which alarm wires are connected. The terminals may be wired in a normally open or normally closed configuration such that the presence or absence, respectively, of a signal (i.e., current flow) indicates an alarm. Thus, the wire, which is typically a twisted pair, extends from the terminal of each monitored network element 102 to a network alarm multiplexer 104. The normally-open/normally-closed, single wire signal may be thought of as a one digit binary signal.

The network alarm multiplexer 104 has a number ($2^n$) of inputs. Each input is dedicated to a single monitored network element 102. When the network alarm multiplexer 104 receives an alarm indication on an input, the network alarm multiplexer 104 converts the alarm signal into a binary coded representation of the input. In some embodiments, the network alarm multiplexer 104 places the binary coded signal directly onto an optical portion of the network 105. In other embodiments, the binary coded signal is transmitted to a parallel telemetry card 106 which then places the signal on the optical network 105 as shown. In either of these cases, the alarm indication is then transmitted to a network monitoring location 108 in the overhead portion of a network data frame. Network data frames are described in more detail with respect to FIG. 2.

Figure 2:
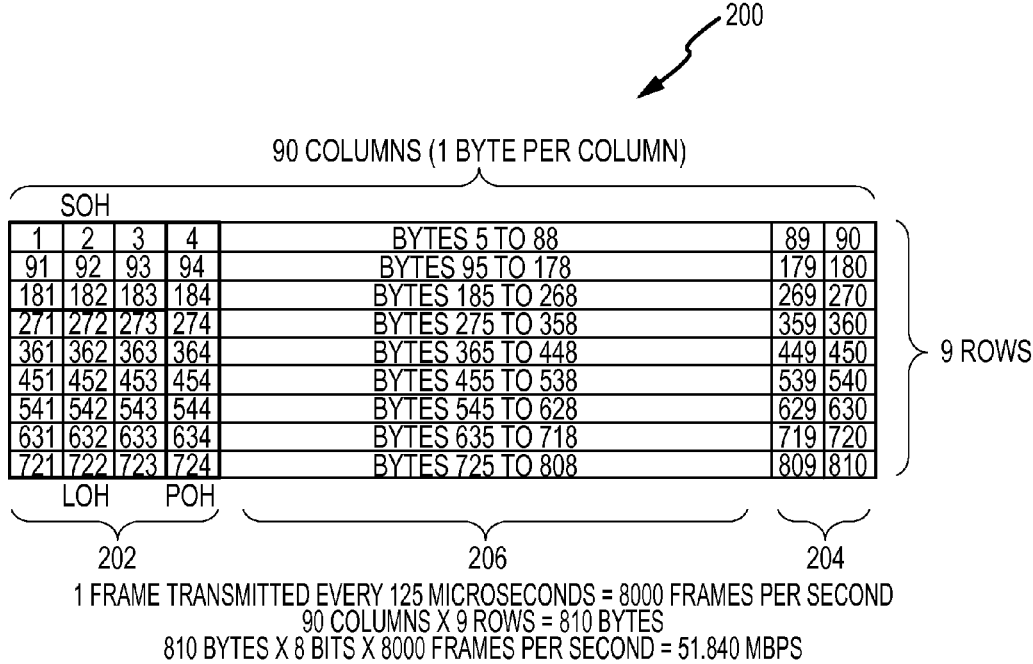
FIG. 2 is a graphical illustration of a data frame, which may transport network alarm signals, according to embodiments of the present invention.

Attention is directed to FIG. 2, which graphically illustrates a single data frame 200. The example of FIG. 2 relates to an Optical Carrier 1 (OC-1) level SONET (Synchronous Optical Network) frame. The OC-1 SONET frame is used for illustrative purposes only. Many other network communication protocols may be used, according to the present invention.

Each row of the SONET OC-1 data frame 200 includes a header portion 202, a trailer portion 204, and a payload portion 206. The header portion 202 and the trailer portion 204 are collectively referred to as the "overhead" portion of the data frame. The overhead carries information used by the network to successfully deliver the data, which is carried in the payload portion 206 of the frame. As previously discussed, other network monitoring systems transport alarm information in the payload portion of the frame, thereby diminishing the total capacity of the network.

Returning to FIG. 1, the network monitoring system 100 also includes a network monitoring location 108. The network monitoring location 108 may be any location where network monitoring takes place. In some embodiments, the network monitoring location is simply a computing device connected to the network. In other embodiments, a plurality of computing devices monitor incoming network alarm signals.

Computing devices at the network monitoring location 108 are programmed to convert the binary coded signal into a visual representation of an indication of an alarm condition. The conversion may be by way of a look-up table that includes entries for each monitored network element 102. When the computing device at the network monitoring location receives the alarm signal, it consults the look-up table and displays information related to the entry. The visual display may be an icon on a computer screen, for example. In some embodiments, depending upon the specific network element in an alarm condition, more noticeable visual alarms, and even audible alarms, may be presented. Many other examples of alarm indications are possible and known to those of skill in the art.

In addition to a visual indication that an alarm has been received and the network element to which the alarm applies, additional information may be presented. For example, in some embodiments, a checklist or other information is presented that instructs a user what to do in the event of the particular alarm being received. Other examples are possible.

The network alarm multiplexer 104 also is capable of producing a signal representing a cleared alarm. For instance, when the alarm condition no longer exists, the network alarm multiplexer 104 senses the change in state from alarmed to not-alarmed and generates a corresponding binary coded signal. As with the binary coded alarm signal, the alarm clear signal travels in the overhead portion of the network traffic. It may be placed there by the network alarm multiplexer or by a parallel telemetry card, as previously discussed with respect to the binary coded alarm signal. The binary coded signal representing the alarm clear may be the negative of the binary coded signal that represented the alarm condition. Negative binary coded representations are known in the art.

The alarm clear signal is then sent to the network monitoring location 108 where it is received and converted into a visual representation that the network element 102 is no longer in an alarm condition. This may simple be a change in the visual appearance of an icon on a computer display screen. Many other examples are possible.

Alarm signals and alarm clear signals may be sent repeatedly until an acknowledgement in received, may be broadcast repeatedly for a period of time or a number of iterations, or may be sent only in response to interrogation from the network monitoring location. Many other signal transmission arrangements and handshake protocols are possible and known in the art.

Figure 3:
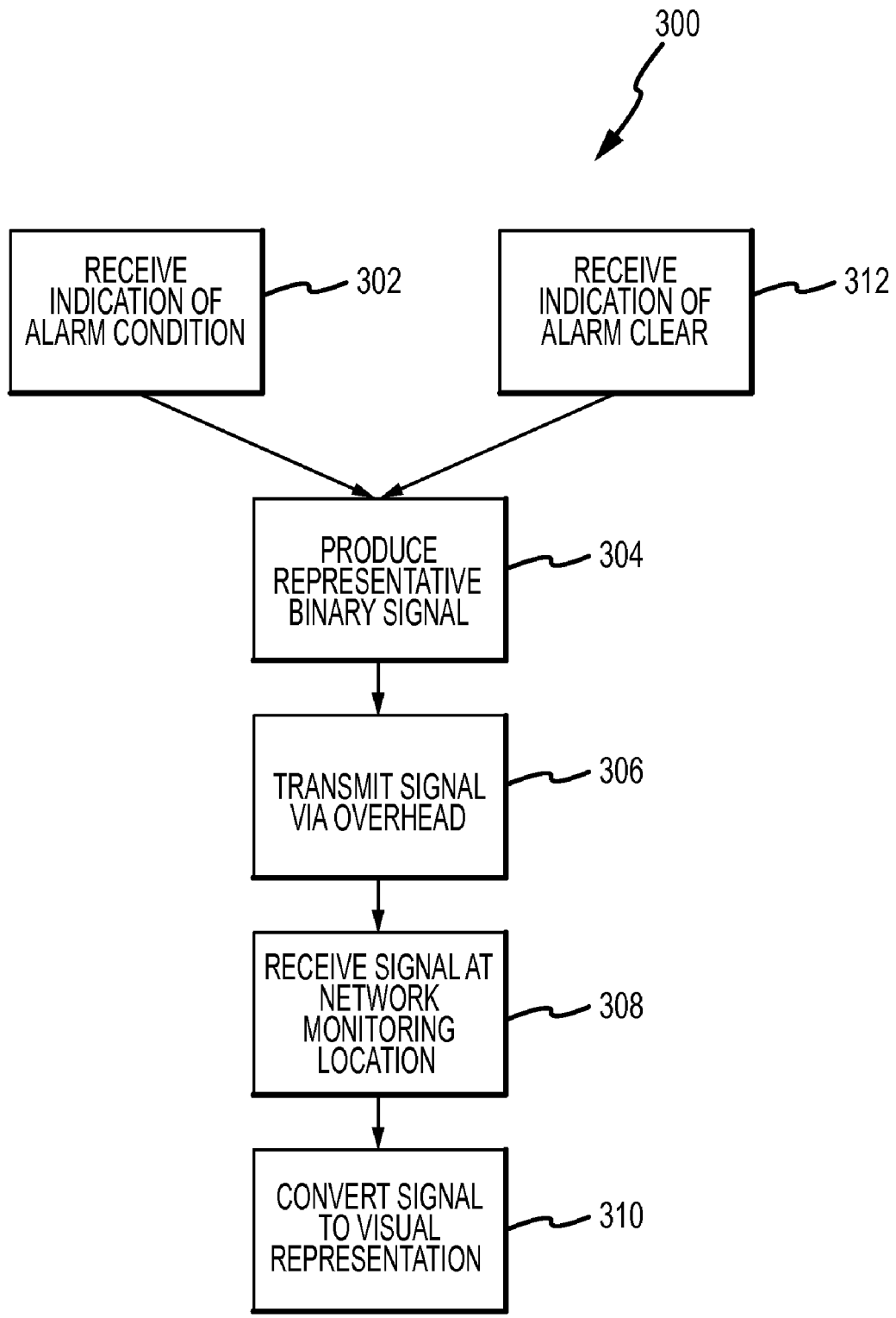
FIG. 3 is a flowchart illustrating a method of monitoring network elements according to embodiments of the present invention.

Attention is now directed to FIG. 3, which illustrates a method 300 of monitoring network elements. The method may be embodied in the system described with respect to FIG. 1. The method begins at operation 302. At this operation, an indication of an alarm condition is received. The indication may be received, for example, by a network multiplexing element, as previously described. At operation 304, the alarm indication is converted into a multi-digit representation of the network item in an alarmed condition. At operation 306, the representation is transmitted over the network in the overhead portion of the network traffic. The signal is received at a network monitoring location at operation 308. At operation 310, the representation is converted to a visual representation of the alarm condition. At operation 312, an alarm clear indication is received. The alarm clear signal may be processed through the same operations as the alarm signal as indicated.

Figure 4:
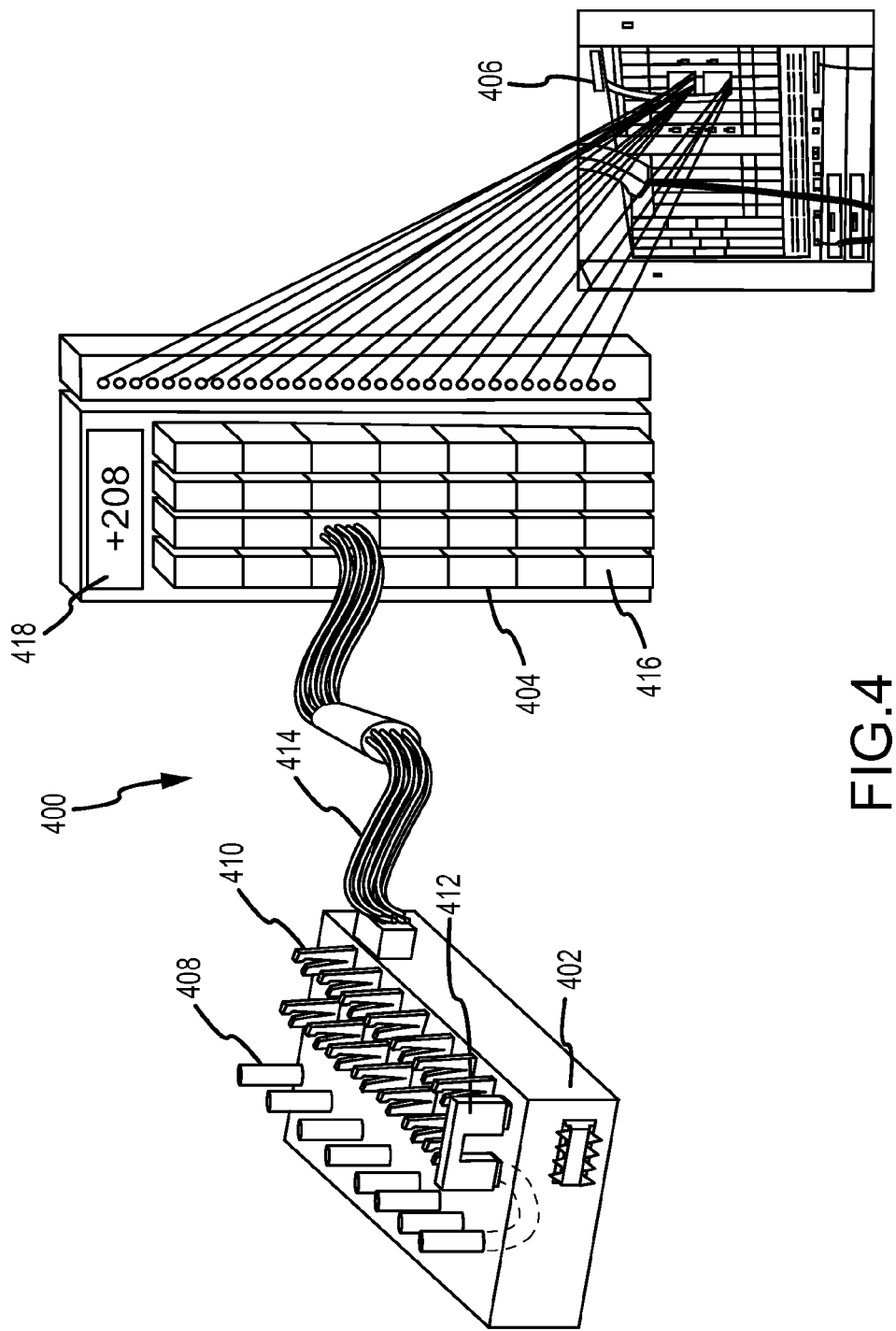
FIG. 4 is a schematic block diagram illustrating one specific, non-limiting embodiment of a portion of a network monitoring system according to embodiments of the present invention.

Having described the present invention generally, attention is directed to FIG. 4, which illustrates a portion of a specific embodiment of a network monitoring system 400 according to the present invention. The system 400 includes an alarm signal multiplexer 402, a controller 404, and a parallel telemetry card 406. The alarm signal multiplexer 402 includes a number of inputs 408. The inputs 408 may comprise a standard 66 block size collection module, which is commonly known. The alarm terminals of the monitored network elements are connected to the inputs 408. As previously discussed, the alarms may be wired in a normally open or a normally closed configuration. Test pins 410 and a bridging clip 412 may be used to test connections between the monitored elements and the inputs 408.

When the alarm signal multiplexer 402 receives an alarm indication on one of the inputs 408, it encodes the alarm indication into a multi-digit representation of the alarmed item and transmits the signal, via a parallel cable 414, to the controller 404. The controller has a number of ports 416, each configured to receive a parallel cable 414 over which a multiplexed signal may be received. The controller 404 further multiplexes the signals from the alarm signal multiplexer 402 based on the signal received and the port 416 into which it is received. The controller 404 then outputs a multi-digit signal to the parallel telemetry card 406, which places the signal on an optical portion of the network in an overhead portion of a data frame. In some embodiments, the controller 404 includes a display 418, which provides a decimal representation of the multi-digit signal representing the alarmed item.

The arrangement of the system 400, wherein signals are multiplexed twice, is done for convenience with respect to operation and maintenance. For example, a 16-input parallel telemetry card can transmit alarm and alarm clear signals representing over 16,000 network elements. However, wiring 16,000 different network elements to a single controller or alarm signal multiplexer would be difficult. Thus, the multiplexing process is carried out in stages. As a result, a number of network items may be wired to a single common block, then multiple common blocks may be wired, by way of a single cable, to the controller. This specific example of the present invention should not be considered limiting.

Although the present invention has been discussed as using binary coded signals to represent the network alarm multiplexer input to which an alarmed network element is connected, this is not required. Other multi-digit representations also may be used and the order of digits with respect to the inputs is not important, as long as each alarmed item is represented by a unique, multi-digit signal that is recognized at the network monitoring location as being representative of the alarmed item. For example, an alarmed network element may produce a two-bit binary signal that transmits four possible states with respect to the element. In another example, a network element may produce a four discrete state, single channel alarm signal. Many other examples are possible.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers into a network and enable communication among the computers. Accordingly, the above description should not be taken as limiting the scope of the invention, which is defined in the following claims.

What is claimed is:

1. A method of monitoring a plurality of network elements relating to a network, the plurality of network elements comprising $2^n$ network elements, the method comprising:
   receiving a single digit binary signal indicative of an alarm condition relating to a specific one of the $2^n$ network elements, wherein the signal at least identifies the specific one of the $2^n$ network elements;
   generating a first multi-digit binary coded signal comprising n digits identifying the specific one of the $2^n$ network elements, the multi-digit binary coded signal being representative of the alarm condition of the specific one of the $2^n$ network elements; and
   transmitting the first multi-digit binary coded signal over the network to a network monitoring location in an overhead portion of a data frame.

2. The method as in claim 1, wherein the multi-digit binary coded signal comprises an eight bit binary signal.

3. The method as in claim 1, wherein the multi-digit binary coded signal comprises a sixteen bit binary signal.

4. The method as in claim 1, further comprising:
   receiving the multi-digit binary coded signal at the network monitoring location; and converting the multi-digit binary coded signal into a visual representation of an alarm condition relating to the specific one of the $2^n$ network elements.

5. The method as in claim 1, further comprising:
   receiving an indication of an absence of an alarm condition relating to the one of the plurality of network elements;
   generating a second multi-digit binary coded signal comprising n digits identifying the specific one of the $2^n$ network elements, the second multi-digit binary coded signal being representative of the absence of an alarm condition relating to the specific one of the $2^n$ network elements; and
   transmitting the second multi-digit binary coded signal over the network to the network monitoring location.

6. The method as in claim 5, further comprising:
   receiving the second multi-digit binary coded signal at the network monitoring location; and
   converting the second multi-digit binary coded signal into a visual representation of an absence of an alarm condition relating to the one of the plurality of network elements.

7. The method as in claim 5, wherein transmitting the second multi-digit binary coded signal comprises transmitting the second multi-digit binary coded signal in an overhead portion of a data frame.

8. A network monitoring system for monitoring a plurality of network elements relating to a network, the plurality of network elements comprising $2^n$ network elements, the network monitoring system comprising:
   means for receiving a single digit binary signal indicative of an alarm condition relating to a specific one of the $2^n$ network elements, wherein the signal at least identifies the specific one of the $2^n$ network elements;
   means for generating a first multi-digit binary coded signal comprising n digits identifying the specific one of the $2^n$ network elements, the multi-digit binary coded signal being representative of the alarm condition of the specific one of the $2^n$ network elements; and
   means for transmitting the first multi-digit binary coded signal over the network in an overhead portion of a data frame to a network monitoring location.

9. The network monitoring system of claim 8, further comprising means for generating a second multi-digit binary coded decimal signal representative of an alarm clear condition relating to one of the plurality of network elements.

10. A system for monitoring a plurality of network elements relating to a network, the plurality of network elements comprising $2^n$ network elements, the system comprising:
    a first receiving arrangement that receives a single digit binary coded signal indicative of an alarm condition relating to a specific one of the $2^n$ network elements, wherein the signal at least identifies the specific one of the $2^n$ network elements;
    a generating arrangement that generates a first multi-digit binary coded signal comprising n digits identifying the specific one of the $2^n$ network elements, the multi-digit binary coded signal being representative of the alarm condition of the specific one of the $2^n$ network elements; and
    a transmitting arrangement that transmits the multi-digit binary coded signal over the network to a network monitoring location in an overhead portion of a data frame.

11. The system of claim 10, wherein the multi-digit binary coded signal comprises an eight bit binary signal.

12. The system of claim 10, wherein the multi-digit binary coded signal comprises a sixteen bit binary signal.

13. The system of claim 10, further comprising:
    a second receiving arrangement that receives the multi-digit binary coded signal at the network monitoring location; and
    a converting arrangement that converts the multi-digit binary coded signal into a visual representation of an alarm condition relating to the one of the plurality of network elements.

14. A system for monitoring a plurality of network elements relating to a network, the plurality of network elements comprising $2^n$ network elements, the system comprising:
    a first receiving arrangement that receives a single digit binary coded signal indicative of an alarm condition relating to one of the plurality of network elements;
    a generating arrangement that generates a first multi-digit binary coded signal comprising n digits identifying the specific one of the $2^n$ network elements, the multi-digit binary coded signal being representative of the alarm condition of the specific one of the $2^n$ network elements; and
    a transmitting arrangement that transmits the multi-digit binary coded signal over the network to a network monitoring location in an overhead portion of a data frame;
    wherein the first receiving arrangement is configured to receive an indication of an absence of an alarm condition relating to the one of the plurality of network elements, wherein the generating arrangement is configured to generate a second multi-digit binary coded signal representative of the absence of an alarm condition relating to the one of the plurality of network monitoring elements, and wherein the transmitting arrangement is configured to transmit the second multi-digit binary coded signal over the network to the network monitoring location.

15. The system of claim 14, wherein the second receiving arrangement is configured to receive the second multi-digit binary coded signal at the network monitoring location and wherein the converting arrangement is configured to convert the second multi-digit binary coded signal into a visual representation of an absence of an alarm condition relating to the one of the plurality of network elements.

16. The system of claim 14, wherein the transmitting arrangement is further configured to transmit the second multi-digit binary coded signal in an overhead portion of a data frame.

* * * * *